United States Patent [19]

Cookson et al.

[11] 4,366,339

[45] Dec. 28, 1982

[54] SEMI-FLEXIBLE GAS-INSULATED TRANSMISSION LINE USING ELECTRIC FIELD STRESS SHIELDS

[75] Inventors: Alan H. Cookson, Churchill Borough; Steinar J. Dale, Monroeville; Philip C. Bolin, Wilkins Township, Allegheny County, all of Pa.

[73] Assignee: Westinghouse Electric Corp., Pittsburgh, Pa.

[21] Appl. No.: 298,691

[22] Filed: Sep. 2, 1981

[51] Int. Cl.³ .................. H01B 9/06; H01B 9/04; H02G 5/06
[52] U.S. Cl. .................. 174/21 JS; 174/21 C; 174/28
[58] Field of Search .......... 174/16 B, 21 C, 21 CA, 174/21 JS, 21 JC, 21 JR, 22 C, 28, 84 S, 88 S, 94 S, 99 B, 99 E; 339/64 R

[56] References Cited

U.S. PATENT DOCUMENTS

| | | | |
|---|---|---|---|
| 3,982,806 | 9/1976 | Wilson et al. | 339/64 R |
| 4,053,700 | 10/1977 | Meyer | 174/21 C |
| 4,111,511 | 9/1978 | Bolin | 339/64 R |

Primary Examiner—Laramie E. Askin
Attorney, Agent, or Firm—M. S. Yatsko

[57] ABSTRACT

A gas-insulated transmission line includes an outer sheath, an inner conductor, an insulating gas electrically insulating the inner conductor from the outer sheath, and insulating supports insulatably supporting the inner conductor within the outer sheath. The inner conductor is provided with flexibility by use of main conductor sections which are joined together through a conductor hub section and flexible flexing elements. Stress shields are provided to control the electric field at the locations of the conductor hub sections where the insulating supports are contacting the inner conductor.

The flexing elements and the stress shields may also be utilized in connection with a plug and socket arrangement for providing electrical connection between main conductor sections.

9 Claims, 10 Drawing Figures

SEMI-FLEXIBLE GAS-INSULATED TRANSMISSION LINE USING ELECTRIC FIELD STRESS SHIELDS

GOVERNMENT RIGHTS STATEMENT

The Government has rights in this invention pursuant to Contract No. DE-AC-01-78-ET-29046 awarded by the U.S. Department of Energy.

BACKGROUND OF THE INVENTION

This invention relates generally to gas-insulated electrical apparatus, and more particularly to a semi-flexible gas-insulated transmission line which utilizes stress shields to control electric field gradients along the transmission line.

Prior art gas-insulated transmission lines typically comprise a hollow, rigid elongated outer sheath at low or ground electrical potential, with a rigid inner conductor disposed within the outer sheath for carrying the electric current. Insulating supports are utilized for supporting the inner conductor within the outer sheath, and an insulating gas, typical of which is sulfur hexafluoride, is utilized for electrically insulating the high potential inner conductor from the grounded outer sheath.

One disadvantage which exists with the present gas-insulated transmission line is the inability of the lines to change direction easily. The present lines are composed of straight sections generally 30-60 feet in length, and changes in direction must be accomplished by fabricating a shorter line section and utilizing elbow sections, or their equivalent, to accomplish the change in direction. It therefore would be advantageous to manufacture and utilize a gas-insulated transmission line which can more readily accommodate changes in line direction.

SUMMARY OF THE INVENTION

In accordance with this invention, there is provided a gas-insulated transmission line which includes an elongated outer sheath with an elongated inner conductor disposed within the outer sheath. The inner conductor is composed of a pair of longitudinally spaced apart cylindrical main conductor sections both of which have the same diameter and have ends facing one another. A flexing element is fixedly secured to each main conductor section end, which flexing element extends radially inwardly from the main conductor section end. A cylindrical conductor hub section, having a diameter less than the diameter of the main conductor section, is fixedly secured to both flexing elements to thereby provide electrical continuity between the two main conductor sections. A stress shield, having an opening formed therein, is fixedly secured to each main conductor section end with the conductor hub section extending through the stress shield openings, with the stress shields being spaced apart from the conductor hub section. The stress shields are curved so as to extend both longitudinally outwardly from the main conductor section end to which it is attached and also radially inwardly therefrom, towards the other stress shield. An insulating gas is utilized for electrically insulating the inner conductor from the outer sheath, and means are provided for insulatably supporting the inner conductor within the outer sheath.

In an additional embodiment of the invention, the stress shields are likewise utilized to control the electric fields at the locations between conductor sections which are connected by a plug and socket arrangement, which plug and socket arrangement takes the place of the conductor hub section.

BRIEF DESCRIPTION OF THE DRAWINGS

Reference is now made to the description of the preferred embodiments, illustrated in the accompanying drawings, in which.

DESCRIPTION OF THE PREFERRED EMBODIMENT

Figure 1:
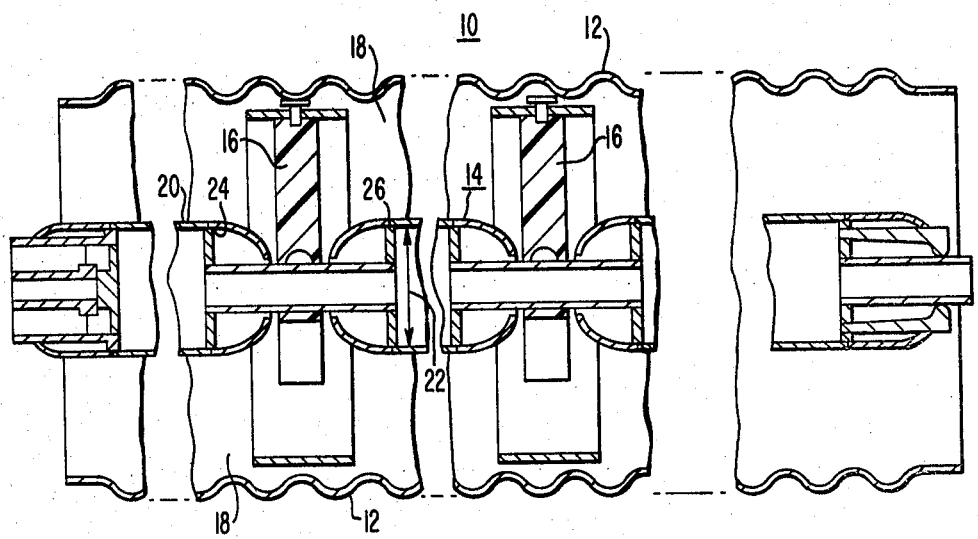
FIG. 1 is a view, in section, of a gas-insulated transmission line utilizing the teachings of this invention.

Referring now more particularly to FIG. 1, therein is illustrated a compressed gas-insulated transmission line 10 illustrating the teachings of this invention. The transmission line 10 is comprised of an elongated outer sheath 12 which is corrugated to provide flexibility, and an elongated, generally cylindrical inner conductor 14 disposed within the outer sheath. A plurality of spaced insulating supports 16 are utilized for insulatably supporting the inner conductor 14 within the outer sheath 12, and an insulating gas 18, typical of which is sulfur hexafluoride at pressures of 50 pounds/square inch gauge, is used for electrically insulating the inner conductor 14 from the outer sheath 12.

Figure 2:
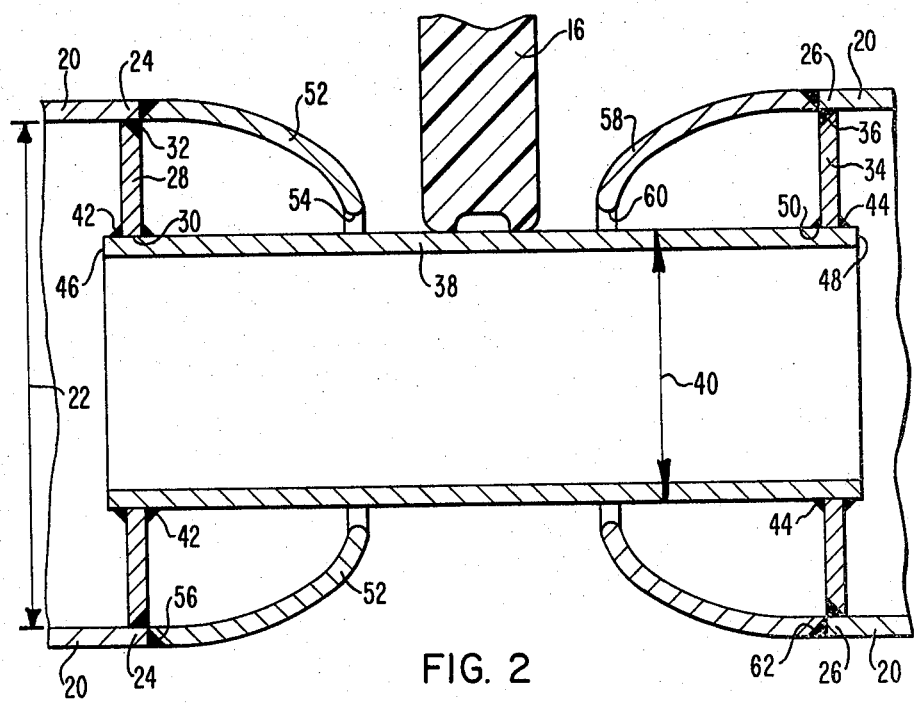
FIG. 2 is a detailed sectional view of the transmission line showing the connection of the stress shields.

The inner conductor 14 is comprised of longitudinally spaced apart cylindrical main conductor sections 20 which each have the same diameter 22 and which have facing ends 24, 26, for example (see FIG. 2). A flexing element 28, illustrated in FIG. 2 as being a flat disc with an opening 30 therethrough, is fixedly secured, by means such as the weld 32, to the conductor end 24, and a similar flexing element 34 with an opening 50 is fixedly secured by means such as the weld 36 to the conductor end 26. As shown, each flexing element 28, 34 extends radially inwardly from the main conductor section end 24, 26, respectively, to which it is secured.

A cylindrical conductor hub section 38, which has an outer diameter 40 less than the inner diameter 22 of the main conductor sections 20, is fixedly secured to the two flexing elements 28, 34 by means such as the welds 42, 44 adjacent the ends 46, 48 of the conductor hub section 38. By being so located, the conductor hub section 38 extends through the openings 30, 50 of the flat disc flexing elements 28, 34.

A curved stress shield 52 having an opening 54 formed therein is fixedly secured, by means such as the weld 56 to the conductor end 24, and a similar stress shield 58, with its opening 60, is secured by means such as the weld 62 to the conductor end 26. When assembled, the conductor hub section 38 extends through the stress shield openings 54, 60, although the stress shields 52, 58 are both spaced apart from the conductor hub section 38. The stress shields 52, 58 extend both longitudinally outwardly from, and radially inwardly from, the main conductor section ends 24, 26 to which they are respectively secured.

Figure 3:
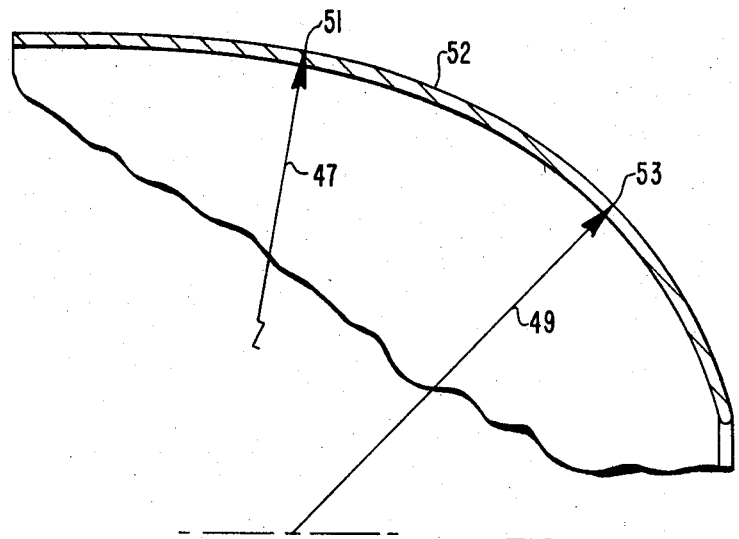
FIG. 3 is a detailed view, in section, of half of the stress shield.

Referring now to FIG. 3, therein is shown a view of one-half of the stress shield 52. The stress shield, in order to provide for optimized electric field reduction, is profiled so as to extend along a curvature formed, for example, by two arcs. For example, for use in a 1200 kV system, the stress shield 52 could extend along a curve formed by the connection of a radius 47 of 8.0 inches ending at the point 51, and a second radius 49 of 3.0 inches terminating at the point 53. The stress shields 52, 58 can be formed either by being spun or stamped as required.

The inner conductor 14 (FIG. 1) is given a degree of flexibility so as to be permitted changes in angular alignment because of the presence of the flexing elements 28, 34. These flexing elements, 28, 34, which pair of flexing elements may be positioned every 6 feet for a 50-foot bending radius, are current carrying members which transfer current from the main conductor sections 20 to the smaller diameter conductor hub section 38. The stress shields 52, 58 are utilized for controlling the electric field on the insulating support 16, and at the location where the insulating support 16 contacts the conductor hub section 38.

Figure 4:
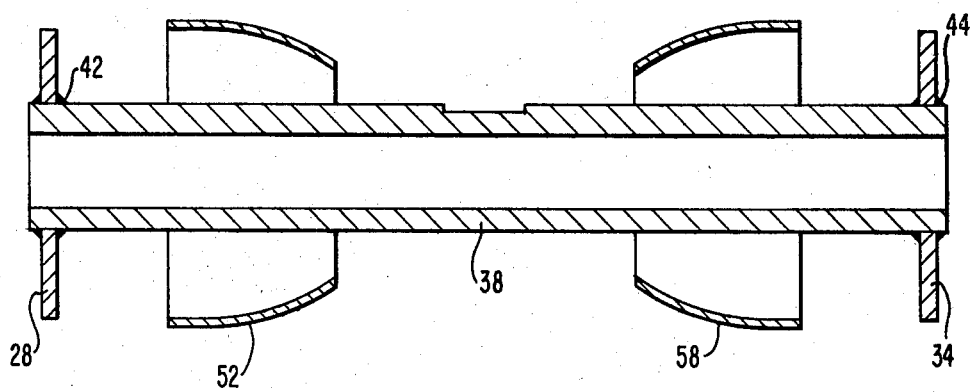
FIG. 4 is a detailed sectional view showing the assembly of the stress shields, flexing elements, and conductor hub.

Referring now to FIG. 4, therein is illustrated one method for assembling the various parts. The stress shields 52, 58 are assembled loosely on the conductor hub section 38, and then the flexing elements 28, 34 are welded at 42, 44 to the conductor hub section 38. This subassembly is then aligned with two main conductor sections 20, and the flexing elements 28, 34 are welded to the ends 24, 26 of the main conductor sections 20. As the final step, the stress shields 52, 58 can then be welded at 56, 62 to the ends 24, 26.

Figure 5:
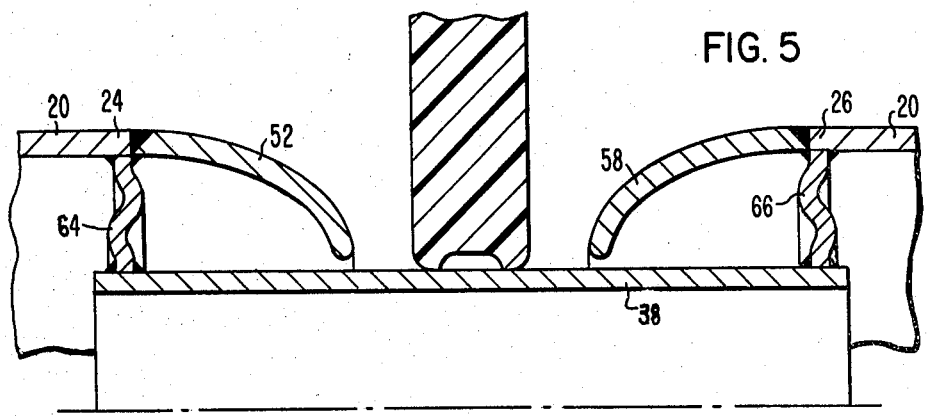
FIGS. 5-9 illustrate modifications of the invention disclosed in FIG. 2.

Referring now more particularly to FIGS. 5-9, therein are shown various modifications to the invention illustrated in FIG. 2 which modifications show various means of obtaining the necessary flexing capability of the inner conductor. In FIG. 5, it is seen that the flexing elements 64, 66 are corrugated instead of being the flat discs illustrated in FIG. 2.

Figure 6:
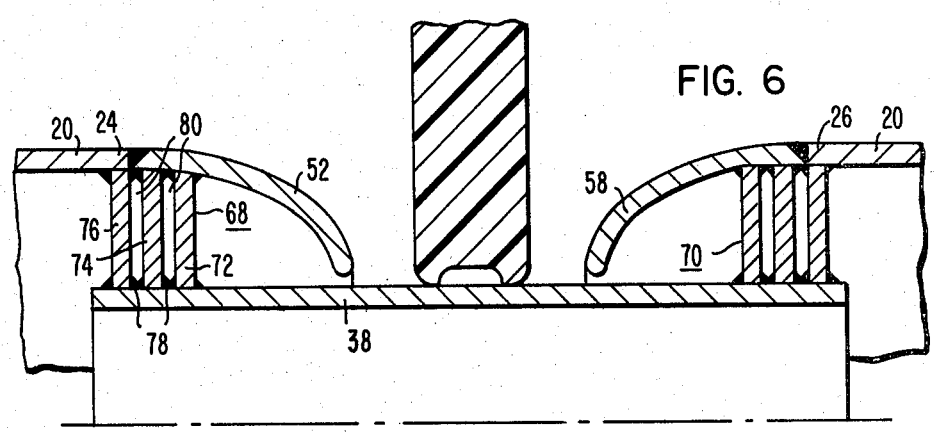

In FIG. 6, the flexing elements 68, 70 are each formed by a plurality, say for example three, separate plates 72, 74, 76 which are welded together by means such as the welds 78, with a gap 80 disposed between adjacent plates. This "laminate" design would be used instead of the, for example, flat discs 28, 34 illustrated in FIG. 2.

Figure 7:
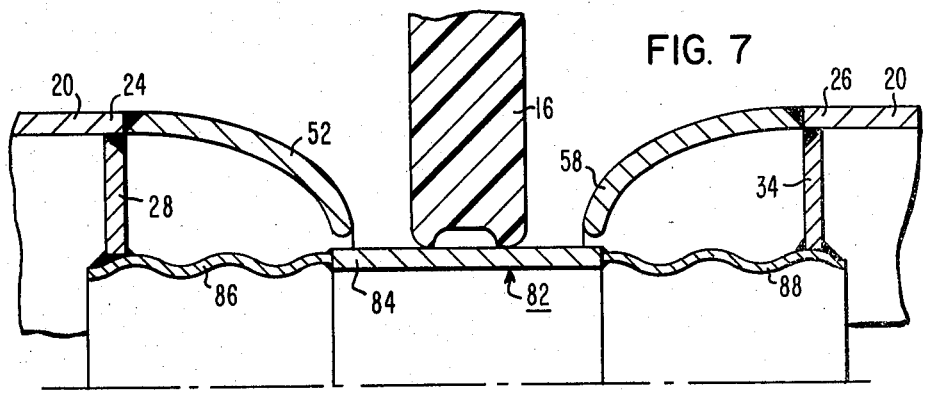

FIG. 7 illustrates a design which includes more flexibility than that illustrated in FIG. 2. In the FIG. 7 embodiment, the conductor hub section 82 is comprised of a central hub portion 84 cylindrical in cross section, with two end sections 86, 88 which are corrugated, and which in turn are welded or otherwise secured to the flexing elements 28, 34. This design provides flexibility not only because of the flexing elements 28, 34, but also because of the presence of the corrugated hub end sections 86, 88.

Figure 8:
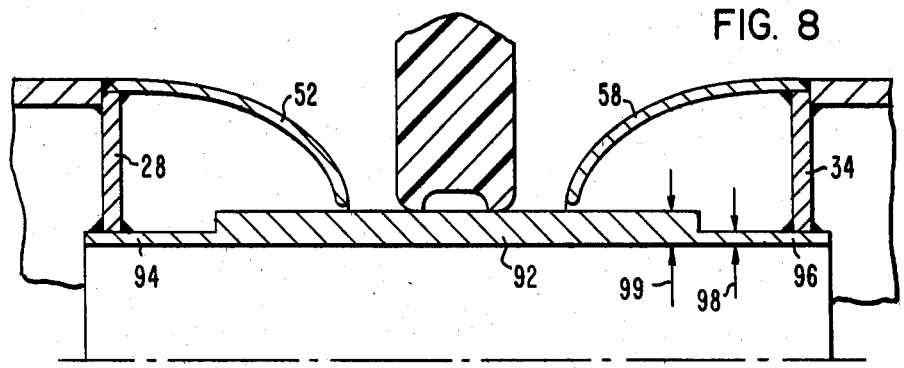
Figure 9:
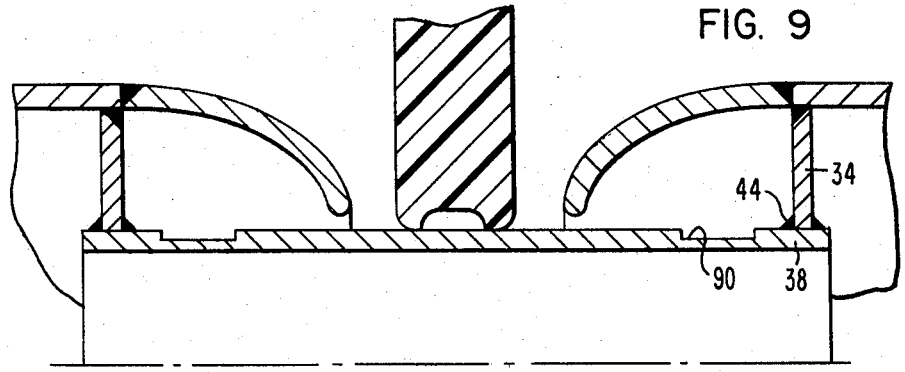

FIGS. 8 and 9 also provide additional flexibility similar to that achieved with the FIG. 7 design. In FIG. 9, a wide groove 90 is machined or otherwise formed in the conductor hub section 38 at locations adjacent to where the flexing element 34 is welded 44 thereto. In FIG. 8, the conductor hub section 92 has end sections 94, 96 which have a wall thickness 98 less than the wall thickness 99 of the remainder of the conductor hub section 92 at points intermediate the end sections 94, 96.

Figure 10:
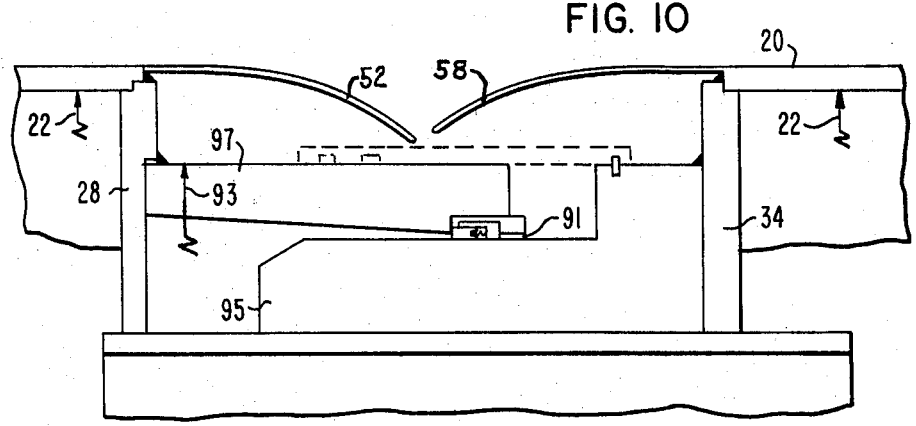
FIG. 10 is a modification of the view shown in FIG. 2 illustrating how the stress shields can be utilized to advantage in conjunction with a plug and socket joint.

Referring now to FIG. 10, therein is illustrated another location wherein it is may be advantageous to provide both the flexibility of the flexing elements and the electric field control provided by the stress shields. In this illustration, the elements are the same as illustrated in FIG. 2, except that the conductor hub section 38 is eliminated, and in its place are disposed a socket member 97 which is secured to the plate 28, and a plug member 95 which is secured to the element 34. As an alternative, for this purpose the elements 28, 34 could be rigid instead of being flexible. As with the main conductor hub 38, the socket member 97 has an outer diameter 93 which is less than the inner diameter 22 of the main conductor sections 20. The plug member extends outwardly from the flexing element 34 and into the central opening 91 present in the socket member. Electrical contact is maintained between the plug member 95 and the socket member 97 so that electric current flows along the path from the one main conductor section 20, through the flexing element 28, the socket member 97, the plug member 95, the flexing element 34 and to the other main conductor section 20. This arrangement may be utilized when connecting together in alignment various manufactured transmission lines.

As can be seen, the invention described herein provides an improved gas insulated transmission line which has a degree of flexibility both on the outer sheath and with the inner conductor, and which provides adequate shielding of the inner conductor at those locations where flexing may occur.

We claim as our invention:

1. A gas-insulated transmission line comprising:
   an elongated outer sheath;
   an elongated inner conductor disposed within said outer sheath, said inner conductor comprising a pair of longitudinally spaced-apart cylindrical main conductor sections having a first diameter and facing ends, a flexing element fixedly secured to each main conductor section end and extending radially inwardly therefrom, a cylindrical conductor hub section having a second diameter less than said first diameter fixedly secured to both flexing elements adjacent the ends of said conductor hub section, and a curved stress shield having an opening formed therein fixedly secured to each main conductor section end with said conductor hub section extending through said stress shield openings, said stress shields being spaced-apart from said conductor hub section and extending both longitudinally-outwardly and radially-inwardly from said main conductor section ends;
   an insulating gas electrically insulating said inner conductor from said outer sheath; and
   means for insulatably supporting said inner conductor in said outer sheath.

2. The transmission line according to claim 1 wherein said supporting means contacts said conductor hub section intermediate and spaced-apart from said stress shields.

3. The transmission line according to claim 1 wherein said flexing elements are flat discs having openings therethrough with said conductor hub section extending through said disc openings.

4. The transmission line according to claim 1 wherein said flexing elements are corrugated.

5. The transmission line according to claim 1 wherein said flexing elements each comprise a plurality of thin plates secured together and having a gap disposed intermediate adjacent plates.

6. The transmission line according to claim 1 wherein said ends of said conductor hub section are corrugated.

7. The transmission line according to claim 1 wherein said conductor hub section has a groove formed therein adjacent each said flexing element.

8. The transmission line according to claim 1 wherein said conductor hub section has a wall thickness at the location of said flexing elements less than the wall thickness of said conductor hub section at a location intermediate said flexing elements.

9. A gas-insulated transmission line comprising:
an elongated outer sheath;
a cylindrical first main conductor having a first diameter disposed within said outer sheath and having an end thereto;
a first element fixedly secured to said first main conductor end and extending radially inwardly therefrom;
a socket member fixedly secured to said first element and extending longitudinally outwardly therefrom, said socket member having a second diameter less than said first diameter;
a cylindrical second main conductor having said first diameter disposed within said outer sheath and having an end thereto spaced-apart from said first main conductor end;
a second element fixedly secured to said second main conductor end and extending radially inwardly therefrom;
a plug member fixedly secured to said second element and extending outwardly therefrom into said socket member, said plug member and said socket member being in electrical contact;
a first curved stress shield having an opening therein fixedly secured to said first main conductor end;
a second curved stress shield having an opening therein fixedly secured to said second main conductor end, said socket member extending through said first and second stress shield openings while being spaced-apart from said first and second stress shields;
an insulating gas electrically insulating said first and second main conductors from said outer sheath; and
means for insulatably supporting said first and second main conductors in said outer sheath.

* * * * *